(12) United States Patent
Kanno et al.

(10) Patent No.: US 11,932,324 B2
(45) Date of Patent: Mar. 19, 2024

(54) ELECTRIC DRIVE DEVICE OF ELECTRIC POWER STEERING APPARATUS

(71) Applicant: Hitachi Automotive Systems, Ltd., Hitachinaka (JP)

(72) Inventors: Kiyotaka Kanno, Hitachinaka (JP); Haruaki Motoda, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 747 days.

(21) Appl. No.: 17/056,127

(22) PCT Filed: Apr. 17, 2019

(86) PCT No.: PCT/JP2019/016414
§ 371 (c)(1),
(2) Date: Nov. 17, 2020

(87) PCT Pub. No.: WO2019/235077
PCT Pub. Date: Dec. 12, 2019

(65) Prior Publication Data
US 2021/0221426 A1   Jul. 22, 2021

(30) Foreign Application Priority Data
Jun. 6, 2018 (JP) ................................ 2018-108453

(51) Int. Cl.
*B62D 5/04* (2006.01)
*H02K 5/22* (2006.01)
*H02K 11/30* (2016.01)

(52) U.S. Cl.
CPC ........... *B62D 5/046* (2013.01); *B62D 5/0403* (2013.01); *H02K 5/22* (2013.01); *H02K 11/30* (2016.01); *H02K 2203/03* (2013.01)

(58) Field of Classification Search
CPC .... B62D 5/046; B62D 5/0403; B62D 5/0406; H02K 5/22; H02K 11/30; H02K 2203/03; H02K 5/225; H02K 11/33
See application file for complete search history.

(56) References Cited

U.S. PATENT DOCUMENTS

2018/0198351 A1   7/2018 Akutsu
2019/0199175 A1   6/2019 Kanazawa
(Continued)

FOREIGN PATENT DOCUMENTS

JP    2010-105640 A    5/2010
JP    2016-146702 A    8/2016
(Continued)

OTHER PUBLICATIONS

International Search Report with English translation and Written Opinion issued in corresponding application No. PCT/JP2019/016414 dated Aug. 13, 2019.

*Primary Examiner* — Minnah L Seoh
*Assistant Examiner* — Marlon A Arce
(74) *Attorney, Agent, or Firm* — Foley & Lardner LLP

(57) ABSTRACT

An object of the present invention is to provide an electric power steering apparatus having a wiring structure effective for simplification. A power supply circuit board 23, a power conversion circuit board 24, and a control circuit board 25 are stacked and disposed in three stages in which the power supply circuit board 23 is disposed in a middle with a first flexible portion 34 and a second flexible portion 35 as a bend portion. A power supply circuit board connection terminal 42B and a control circuit board connection terminal 52B provided in a connector terminal assembly are electrically connected to a receiving terminal 42C of the power supply (Continued)

circuit board 23 and a receiving terminal 52C of the control circuit board 25, respectively, by being inserted and press-fitted thereinto.

5 Claims, 5 Drawing Sheets

(56) References Cited

U.S. PATENT DOCUMENTS

| 2019/0300047 | A1 | | 10/2019 | Hamada | |
|---|---|---|---|---|---|
| 2020/0287440 | A1 | * | 9/2020 | Kanazawa | B62D 5/04 |
| 2020/0382047 | A1 | * | 12/2020 | Araki | H02M 7/48 |
| 2020/0406959 | A1 | * | 12/2020 | Tateyama | H05K 1/147 |
| 2022/0278587 | A1 | * | 9/2022 | Motoda | H02K 5/225 |

FOREIGN PATENT DOCUMENTS

| JP | 2018-038218 A | 3/2018 |
|---|---|---|
| JP | 2018-082514 A | 5/2018 |
| WO | WO-2017/022094 A1 | 2/2017 |

\* cited by examiner

ELECTRIC DRIVE DEVICE OF ELECTRIC POWER STEERING APPARATUS

TECHNICAL FIELD

The present invention relates to an electric power steering apparatus having an electric drive device which includes an electric motor and an electronic control unit which controls the electric motor.

BACKGROUND ART

As a background art of the present technical field, electric power steering apparatuses described in JP 2010-105640 A (PTL 1), JP 2016-146702 A (PTL 2), and JP 2018-038218 A (PTL 3) are known.

The power steering apparatus of PTL 1 includes an electric motor which applies a steering assist force to a steering mechanism which transmits a steering torque transmitted to a steering wheel to steered wheels via a steering shaft, and a control unit which drives and controls this electric motor, in which the control unit has a circuit board in which portion between a plurality of rigid board portions on which a circuit component is mounted are connected by a bent portion having flexibility (refer to abstract). Further, PTL 1 discloses a configuration, in which a power rigid board portion is formed on a lower side and a control rigid board portion is formed on an upper side so as to form a U shape, and the circuit component such as a semiconductor switching element mounted on the power rigid board portion is electrically connected to the control rigid board portion by a wiring pattern formed in the bent portion (refer to paragraphs 0022 and 0023, and FIG. 3). In PTL 1, in the control unit, board surfaces of the power rigid board portion and the control rigid board portion are disposed parallel to a rotation axis of the electric motor (refer to FIG. 2).

The power steering apparatus of PTL 2 includes a power supply circuit unit which generates a necessary power supply, a power conversion circuit unit which includes a power switching element including a MOSFET and an IGBT inverter which drives and controls an electric motor, and a control circuit unit which controls the power switching element, in which the power supply circuit unit, the power conversion circuit unit, and the control circuit unit are arranged in this order from a lid toward a motor housing side, the control circuit unit is disposed at a distance from the power supply circuit unit, and thus, stable power is supplied to the control circuit unit after a power supply noise is removed (refer to paragraphs 0021 and 0052). Furthermore, PTL 2 discloses a configuration in which a connection can be completed simply by inserting a power supply-side connector terminal into a press-fit type power supply connector provided in the power supply circuit unit (refer to paragraph 0056). Meanwhile, a high voltage-side connector wiring unit for supplying power which connects the power supply circuit unit disposed closest to the lid and the power conversion circuit unit disposed next to the power supply circuit unit to each other includes a high voltage-side connector terminal connected to the power supply circuit unit side and an inverter-side connector terminal connected to the power conversion circuit unit side, in which the inverter-side connector terminal is TIG welded to an inverter-side connector of the power conversion circuit unit, and the connection can be completed simply by inserting the high voltage-side connector terminal into a press-fit type high voltage-side connector (refer to paragraphs 0057 and 0058). In addition, a low voltage-side connector wiring unit for supplying power which connects the power supply circuit unit disposed closest to the lid side and the control circuit unit disposed at a position farthest from the lid side to each other includes a low voltage-side connector terminal connected to the power supply circuit unit side and a control-side connector terminal connected to the control circuit unit side, in which the control-side connector terminal is solder-joined to a connection hole of the control circuit unit, and the connection can be completed simply by fitting the low voltage-side connector terminal into a socket-type low voltage-side connector (refer to paragraphs 0061 and 0063).

Similarly to PTL 2, the power steering apparatus of PTL 3 includes a power supply circuit unit, a power conversion circuit unit, and a control circuit unit, and the power conversion circuit unit, the power supply circuit unit, and the control circuit unit are disposed in this order in a direction away from an end surface portion side of a motor housing. (refer to paragraphs 0028 and 0036).

CITATION LIST

Patent Literature

PTL 1: JP 2010-105640 A
PTL 2: JP 2016-146702A
PTL 3: JP 2018-038218 A

SUMMARY OF INVENTION

Technical Problem

In the power steering apparatus of PTL 1, two rigid board portions are connected to each other by the bent portion having flexibility, and the rigid board portions are disposed to be stacked in two stages. In this power steering apparatus, in the control unit, the board surfaces of the power rigid board portion and the control rigid board portion are disposed in parallel to the rotation axis of the electric motor, and thus, each board surface can be enlarged.

However, there is a demand for miniaturization of the control unit due to a requirement for disposing the control unit at the end portion of the electric motor in a rotation axis direction or other reasons, and a configuration in which the boards are disposed in more multiple stages is proposed.

In the power steering apparatus of PTL 2, the control unit has a three-stage configuration including the power supply circuit unit, the power conversion circuit unit, and the control circuit unit. The power supply circuit unit, the power conversion circuit unit, and the control circuit unit are disposed in this order along the rotation axis direction of the electric motor from the lid toward the motor housing side. Further, this power steering apparatus uses the press-fit type connector for the power supply connector and the high voltage-side connector, and the socket type connector for the low voltage-side connector, and thus, the power supply-side connector terminal, the high voltage-side connector terminal, and the low voltage-side connector terminal are simply connected to each other.

However, in the power steering apparatus of PTL 2, the power supply circuit unit, the power conversion circuit unit, and the control circuit unit are disposed in this order from the lid toward the motor housing side, and the dispositions of the power supply circuit unit, the power conversion circuit unit, and the control circuit unit are not sufficiently considered for simplifying a wiring structure.

In the power steering apparatus of PTL 3, the disposition order of the power supply circuit unit, the power conversion circuit unit, and the control circuit unit is different from that in PTL 2, that is, the power conversion circuit unit, the power supply circuit unit, and the control circuit unit are disposed in this order in the direction away from the end surface portion side of the motor housing (from the motor housing to the lid side).

However, in PTL 3, an electrical connection (wiring structure) between the power conversion circuit unit, the power supply circuit unit, and the control circuit unit, and welding or a soldering connection for the wiring connection are not sufficiently considered for a simple wiring structure.

An object of the present invention is to provide an electric power steering apparatus having a wiring structure effective for simplification.

Solution to Problem

To achieve the object, there is provided an electric drive device of an electric power steering apparatus according to the present invention including: an electric motor; and an electronic control unit which is disposed on a side opposite to an output shaft of the electric motor with respect to the electric motor in an axial direction of the output shaft and controls the electric motor, in which the electronic control unit includes a power supply circuit board which generates a power supply, a power conversion circuit board which has a power switching element which drives and controls the electric motor, a control circuit board which controls the power switching element, and a connector terminal assembly which constitutes a connector terminal with a power supply wiring member and a signal wiring member, the power supply circuit board, the power conversion circuit board, and the control circuit board have a first flexible portion and a second flexible portion between two adjacent boards, and are stacked and disposed in three stages in which the power supply circuit board is disposed between the power conversion circuit board and the control circuit board with the first flexible portion and the second flexible portion as a bend portion, the connector terminal assembly has a power supply circuit board connection terminal which is provided at an end portion of the power supply wiring member and a control circuit board connection terminal which is provided at an end portion of the signal wiring member, and is disposed on a side away from the electric motor with respect to the power supply circuit board, the power conversion circuit board, and the control circuit board, and the power supply circuit board connection terminal and the control circuit board connection terminal are electrically connected to a receiving terminal of the power supply circuit board and a receiving terminal of the control circuit board, respectively, by being inserted and press-fitted thereinto.

Advantageous Effects of Invention

According to the present invention, it is possible to provide an electric power steering apparatus having a wiring structure which is effective in reducing noise and simplification. Objects, configurations, and effects other than those described above will be clarified by the following description of an embodiment.

DESCRIPTION OF EMBODIMENTS

Before an embodiment of the present invention is described, as an example, a configuration of an electric power steering apparatus 1 to which the present invention is applied will be briefly described with reference to FIGS. 1 and 2.

Figure 1:
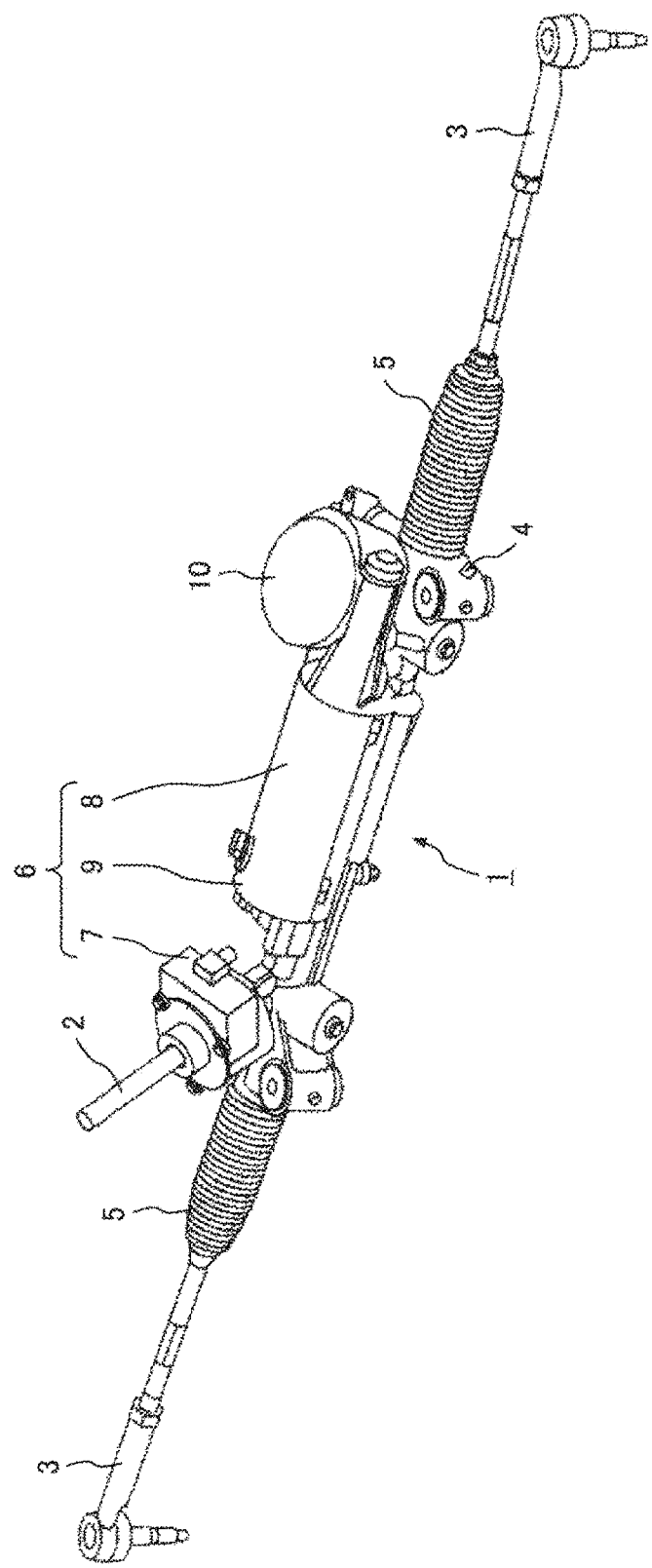
FIG. 1 is an overall perspective view of an electric power steering apparatus to which the present invention is applied as an example.

FIG. 1 is an overall perspective view of the electric power steering apparatus 1 to which the present invention is applied as an example.

The electric power steering apparatus 1 is a device for steering a steering wheel (usually front wheel) of an automobile and is configured as illustrated in FIG. 1. A pinion (not illustrated) is provided at a lower end of a steering shaft 2 connected to the steering wheel (not illustrated), and this pinion meshes with a rack (not illustrated) which is long in a right-left direction of a vehicle body. Tie rods 3 for steering the front wheels in the right-left direction are connected to both ends of the rack, and the rack is covered with a rack housing 4. Rubber boots 5 are provided between the rack housing 4 and the tie rods 3.

An electric drive device 6 is provided to assist a torque when rotating the steering wheel. The electric drive device 6 includes a torque sensor 7 which detects a turning direction and a turning torque of the steering shaft 2, an electric motor unit 8 which applies a steering assist force to the rack via a gear 10 based on a detection value of the torque sensor 7, and an electronic control unit (ECU) 9 which controls an electric motor disposed in the electric motor unit 8. The electric motor unit 8 of the electric drive device 6 is connected to the gear 10 at a plurality of locations on an outer peripheral portion on an output shaft side through bolts (not illustrated), and the electronic control unit 9 is provided on an end portion on a side opposite to the output shaft side of the electric motor unit 8. The torque sensor 7 may be configured separately from the electric drive device 6.

In the electric drive device 6, when the steering shaft 2 is rotated in any direction by operating the steering wheel, the torque sensor 7 detects the rotation direction and the rotation torque of the steering shaft 2, and the electronic control unit 9 calculates a drive operation amount of the electric motor based on the detection value. Based on the calculated drive operation amount, the electric motor is driven by a power switching element of a power conversion circuit unit 24 (refer to FIG. 3), and the output shaft of the electric motor is rotated to drive the steering shaft 2 in the same direction as the operation direction. The rotation of the output shaft is transmitted from the pinion (not illustrated) to the rack (not illustrated) via the gear 10 to steer the vehicle. Configurations and operations thereof are already well known, and further description will be omitted.

Figure 2:
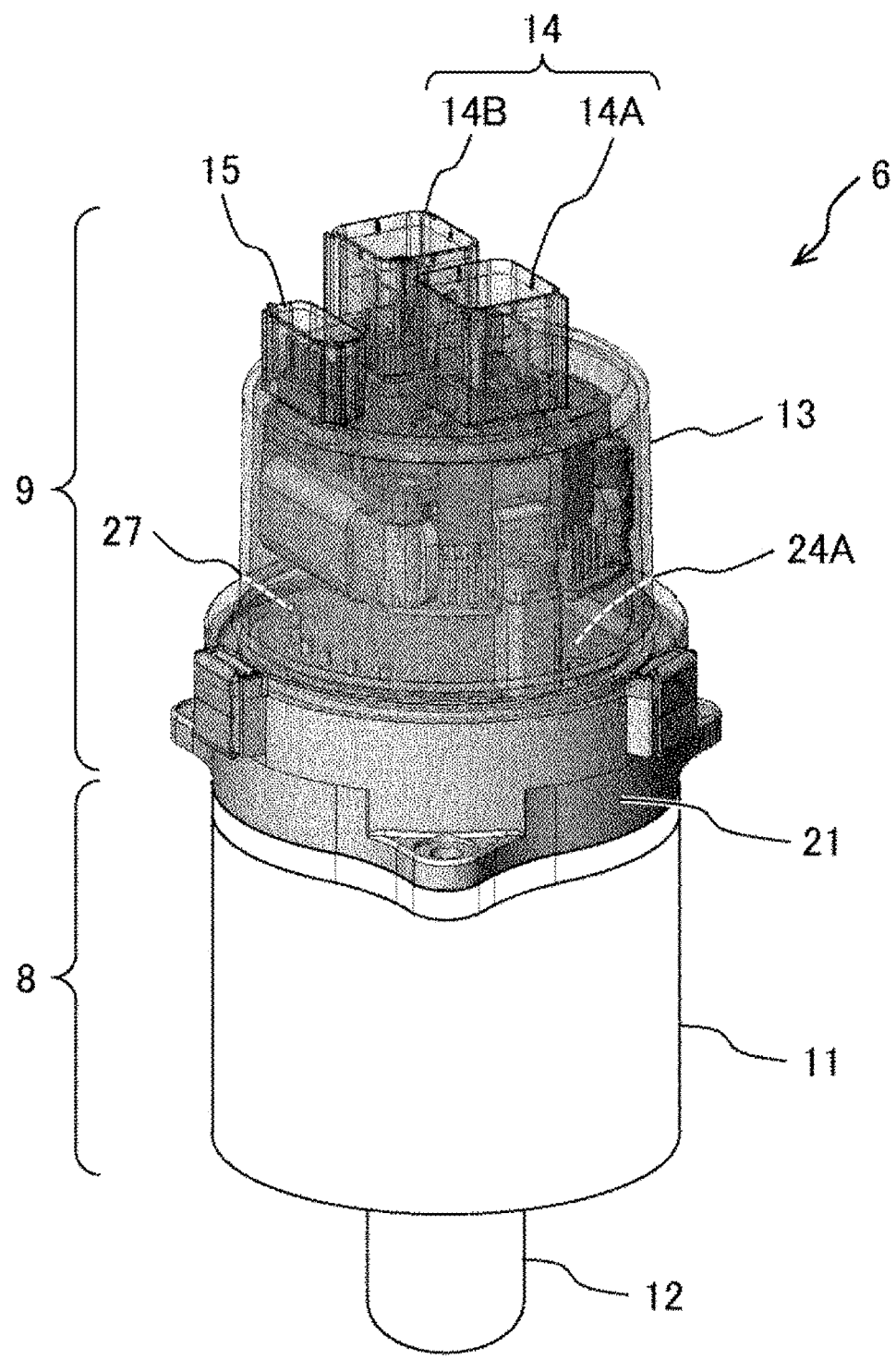
FIG. 2 is an overall perspective view of an electric drive device of an electric power steering apparatus according to an embodiment of the present invention.

FIG. 2 is an overall perspective view of the electric drive device 6 of the electric power steering apparatus 1 according to an embodiment of the present invention. FIG. 2 illustrates an electronic control component assembly 22 (refer to FIG. 3) inside a cover 13 with the cover 13 seen through.

As illustrated in FIG. 2, the electric drive device 6 includes the electric motor unit 8 and the electronic control unit 9. The electric motor unit 8 includes a motor housing 11 having a tubular portion made of an aluminum alloy or the like, and an electric motor (not illustrated) housed in the motor housing 11. Since a specific structure of the electric motor is well known, the description thereof is omitted here. However, a coil input terminal of the electric motor is electrically connected to an output terminal of a power switching element (not illustrated) mounted on a power conversion circuit board 24A of the power conversion circuit unit 24 (refer to FIG. 3) via a bus bar 27 or a motor coil wire.

The electronic control unit 9 is fixed to one end portion (an end portion on a side opposite to the output shaft 12 side) of the electric motor along an axial direction of a rotating shaft (output shaft) 12. That is, the electronic control unit 9 is arranged at an end portion of the motor housing 11 on the side opposite to the output shaft 12 side in the axial direction of the electric motor. Here, the axial direction is a direction along the axial direction of the rotating shaft 12, and in the following description, the direction along the axial direction of the rotating shaft 12 is simply referred to as an axial direction.

The configuration of the electronic control unit 9 will be described with reference to FIGS. 3 to 5.

Figure 3:
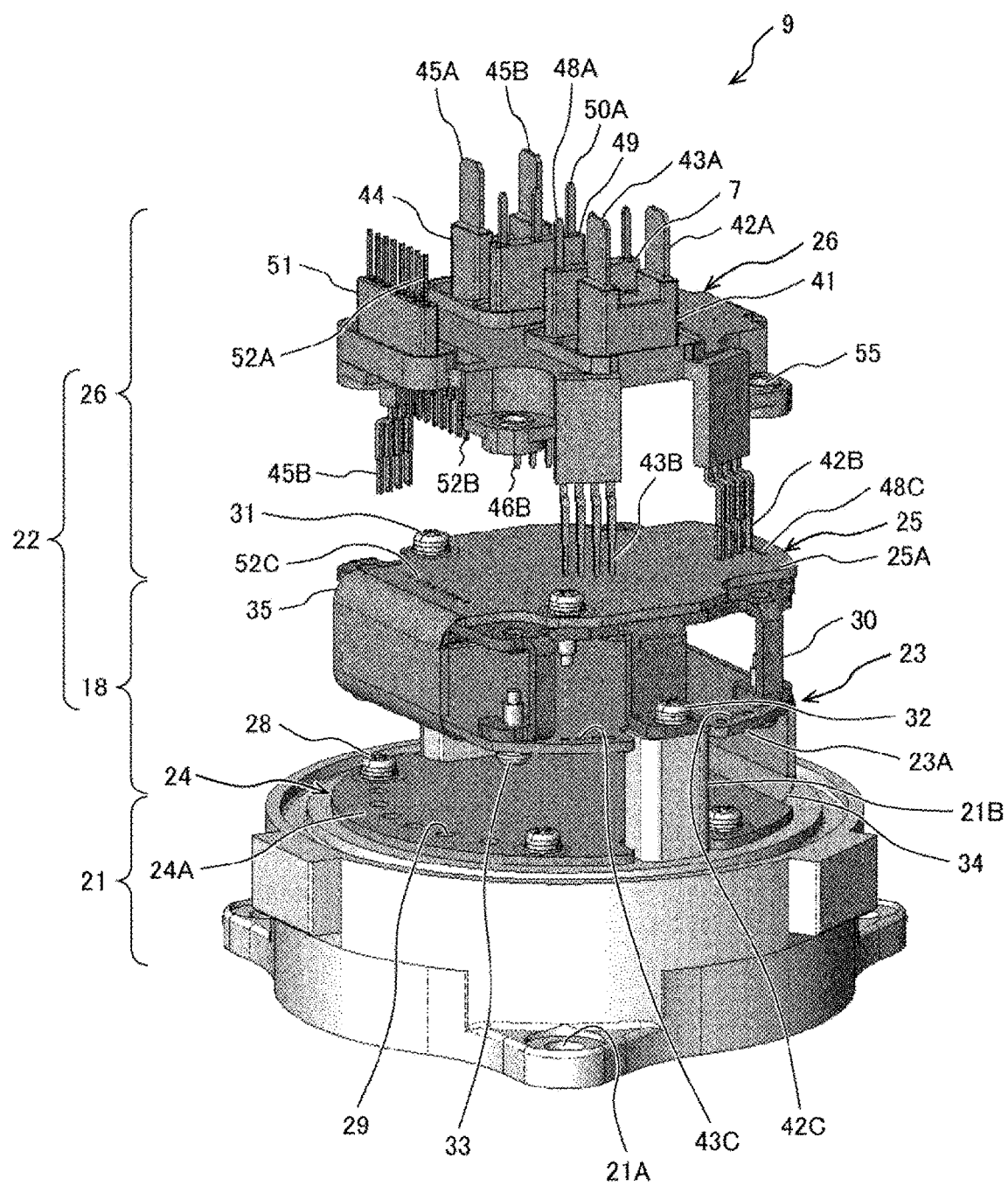
FIG. 3 is an exploded perspective view of an electronic control unit and illustrates a state in which a cover is removed.

FIG. 3 is an exploded perspective view of the electronic control unit 9 and illustrates a state in which the cover 13 is removed.

The electronic control unit 9 includes a basic substance 21, the electronic control component assembly 22 fixed to the basic substance 21, and the cover 13 which covers the electronic control component assembly 22.

The basic substance 21 is fixed to the motor housing 11 with bolts (not illustrated). Accordingly, a plurality of bolt insertion holes 21A into which the bolts are inserted are provided on an outer periphery of the basic substance 21 on the motor housing 11 side. The basic substance 21 is also a member which also functions as a heat sink which radiates the heat generated in the power conversion circuit unit 24.

An end portion of the cover 13 facing the basic substance 21 is integrally fixed to the basic substance 21 by adhesion, welding, or a fastening method using a fixing bolt. Further, a plurality of outer frame portions 14 (14A and 14B) and 15 of a connector housing are formed at an end portion (end surface) opposite to the end portion of the cover 13 facing the basic substance 21.

The electronic control component assembly 22 housed in an internal space of the cover 13 is configured to include a circuit component assembly 18 and a connector terminal assembly 26 having a connector terminal. The circuit component assembly 18 includes a power supply circuit unit 23 which generates a power supply necessary for the electronic control unit 9, a power conversion circuit unit (driver circuit unit) 24 having a power switching element which includes a MOSFET, an IGBT, or the like for driving and controlling the electric motor of the electric motor unit 8, and a control circuit unit 25 which controls the power switching element.

In the circuit component assembly 18, the power conversion circuit unit 24, the power supply circuit unit 23, and the control circuit unit 25 are disposed in this order in a direction away from the basic substance 21 and the motor housing 11 on the basic substance 21 side of the motor housing 11. Among the power conversion circuit unit 24, the power supply circuit unit 23, and the control circuit unit 25, the power conversion circuit unit 24 is disposed at a position closest to the motor housing 11 and the electric motor, the control circuit unit 25 is disposed at a position farthest from the motor housing 11 and the electric motor, and the power supply circuit unit 23 is disposed between the power conversion circuit unit 24 and the control circuit unit 25. The connector terminal assembly 26 is disposed farther from the motor housing 11 and the electric motor than the control circuit unit 25.

The power conversion circuit unit 24 has a power conversion circuit board 24A, and the power conversion circuit board 24A is fixed to the basic substance 21 with a bolt 28 via a heat dissipation material. Circuit components such as a power switching element (not illustrated) are mounted on the power conversion circuit board 24A. For example, the circuit components are the same as those described in PTL 3, and a description thereof will be omitted here. The power conversion circuit board 24A includes a through hole 29 through which the bus bar 27 or the motor coil wire described above is inserted.

The control circuit unit 25 has a control circuit board 25A, and the control circuit board 25A is fixed to a distal end portion of a column 21B uprightly standing on the basic substance 21 via a spacer 30. That is, the spacer 30 is fixed to a board surface of the control circuit board 25A facing the motor housing 11 side by a fastening member (screw or bolt) 31, the spacer 30 is further fixed to the distal end portion of the column 21B by a fastening member (screw or bolt) 32, and thus, the control circuit board 25A is fixed to the basic substance 21. A microcomputer (not illustrated) and peripheral circuit components thereof are mounted on the control circuit board 25A. For example, the circuit components are the same as those described in PTL 3, and a description thereof will be omitted here.

The power supply circuit unit 23 has a power supply circuit board 23A, and the power supply circuit board 23A is supported by the control circuit board 25A via the spacer 30. Therefore, the power supply circuit board 23A is fixed to the spacer 30 by a fastening member (screw or bolt) 33. A power supply circuit including a capacitor, a coil, or the like (not illustrated) is formed on the power supply circuit board 23A. For example, this power supply circuit can be configured similarly to that described in PTL 3, and a description thereof will be omitted here.

In the power supply circuit board 23A, the power conversion circuit board 24A, and the control circuit board 25A, the power supply circuit board 23A and the power conversion circuit board 24A are connected to each other by a first flexible portion 34 having flexibility, and the power supply circuit board 23A and the control circuit board 25A are connected to each other by a second flexible portion 35 having flexibility.

The power supply circuit board 23A, the power conversion circuit board 24A, and the control circuit board constitute a rigid portion (rigid board) which is hard and unbending, and the first flexible portion 34 and the second flexible portion 35 constitute a flexible portion (flexible board) which is soft and has flexibility. The power supply circuit board 23A, the power conversion circuit board 24A, and the control circuit board 25A, together with the first flexible portion 34 and the second flexible portion 35, form a rigid flexible board in which the rigid portion and the flexible portion are integrated with each other. The rigid flexible board only needs to have the rigid portion (rigid board) and the flexible portion (flexible board), a material forming the rigid flexible board is not particularly limited, and the rigid flexible board can be formed of a general rigid flexible board material.

The power supply circuit board 23A, the power conversion circuit board 24A, and the control circuit board are a board component integrally configured with each other, the first flexible portion 34 and the second flexible portion 35 constitute a bent portion (bend portion), and the power supply circuit board 23A, the power conversion circuit board 24A, and the control circuit board 25A are stacked in three stages (three layers) with a gap between the boards so as to be disposed three-dimensionally.

A predetermined gap (space) is provided between the power supply circuit board 23A and the control circuit board 25A by the spacer 30, and a predetermined gap (space) is provided between the power supply circuit board 23A and the power conversion circuit board 24A by the spacer 30 and the column 21B.

Each of the connectors formed in the power conversion circuit unit 24, the power supply circuit unit 23, the control circuit unit 25, and the connector terminal assembly 26 is duplicated so that even if one system fails, the other system can be used to supplement a function of the failed system.

The connector terminal assembly 26 will be described with reference to FIG. 4 together with FIG. 3. FIG. 4 is a plan view when the connector terminal assembly 26 is viewed from a side opposite to the basic substance 21 side (motor housing 11 side).

The connector terminal assembly 26 includes connector terminal forming portions 41 and 44 for power supply, a connector terminal forming portion 51 for a detection sensor, and connector terminal forming portions 47 and 49 for transmitting a control state to an external device. By covering the connector terminal assembly 26 with the cover 13, the connector terminal forming portion 41, the connector terminal forming portion 47, and the outer frame portion 14A of the cover 13 are integrated with each other to constitute one connector housing, the connector terminal forming portion 44, the connector terminal forming portion 49, and the outer frame portion 14B of the cover 13 are integrated with each other to constitute one connector housing, and the connector terminal forming portion 51 and the outer frame portion 15 of the cover 13 are integrated with each other to constitute one connector housing.

The basic substance (connector terminal assembly basic substance) 26A of the connector terminal assembly 26 is made of synthetic resin, and power supply wires (power supply wiring members) 42 and 45 and ground wires (ground wiring members, GND wiring members) 43, 46, and 53, and signal wires (signal wiring members) 48, 50, and 52 are molded in the synthetic resin connector terminal assembly basic substance 26A. The connector terminal assembly 26 has the power supply wires (power supply wiring members) 42 and 45, the ground wires (ground wiring members, GND wiring members) 43, 46, and 53, and signal wires (signal wiring members) 48, 50, and 52, which are members which constitute connectors (connector terminals) for electrical connection with an external power supply or an external device. That is, one end portion of each of the power supply wires 42 and 45, the ground wires 43, 46, and 53, and the signal wires 48 and 50 constitutes a connector terminal for electrically connecting with the external power supply or the external device.

Figure 4:
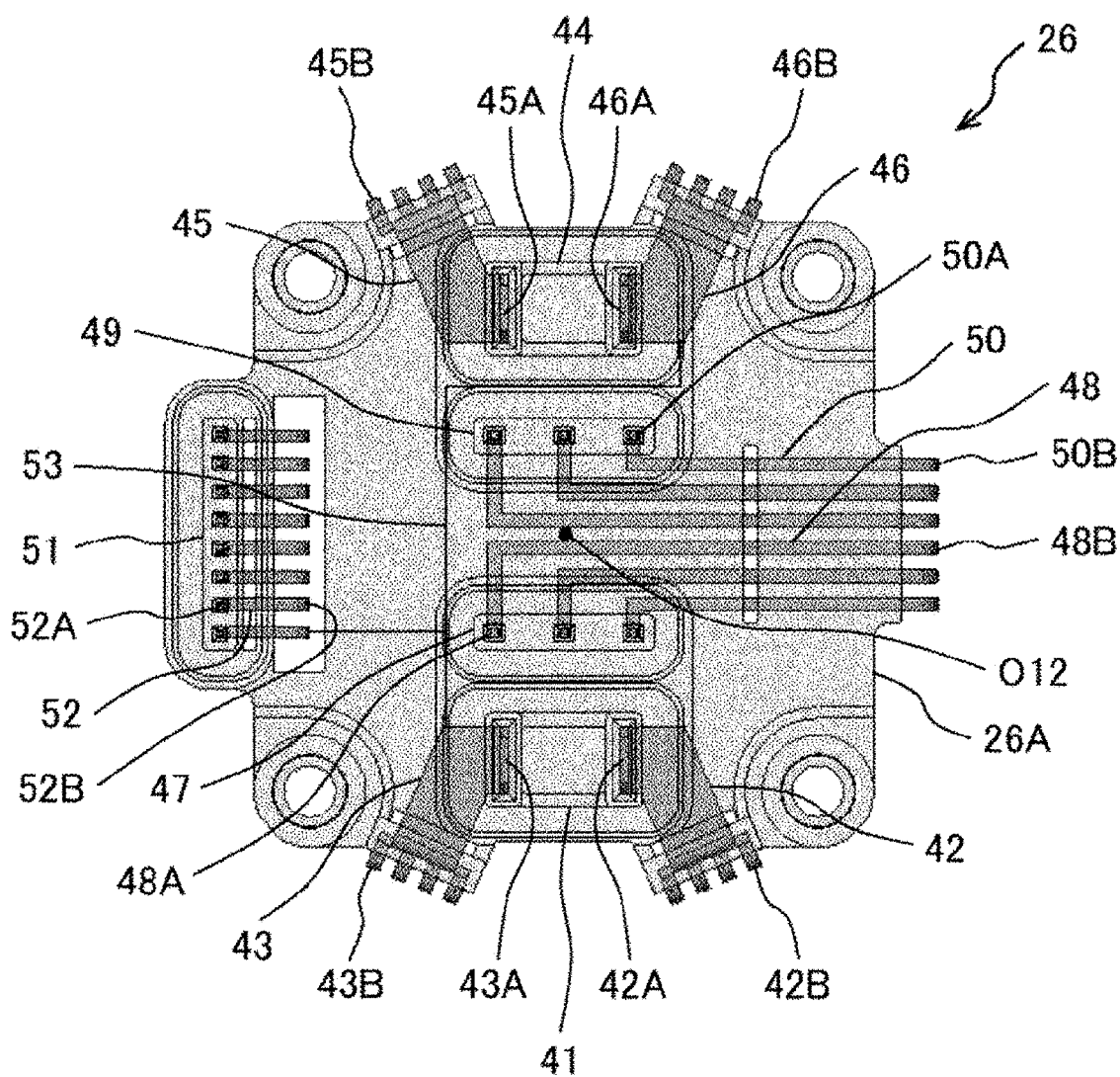
FIG. 4 is a plan view when a connector terminal assembly is viewed from a side opposite to a basic substance side (motor housing side).
Figure 5:
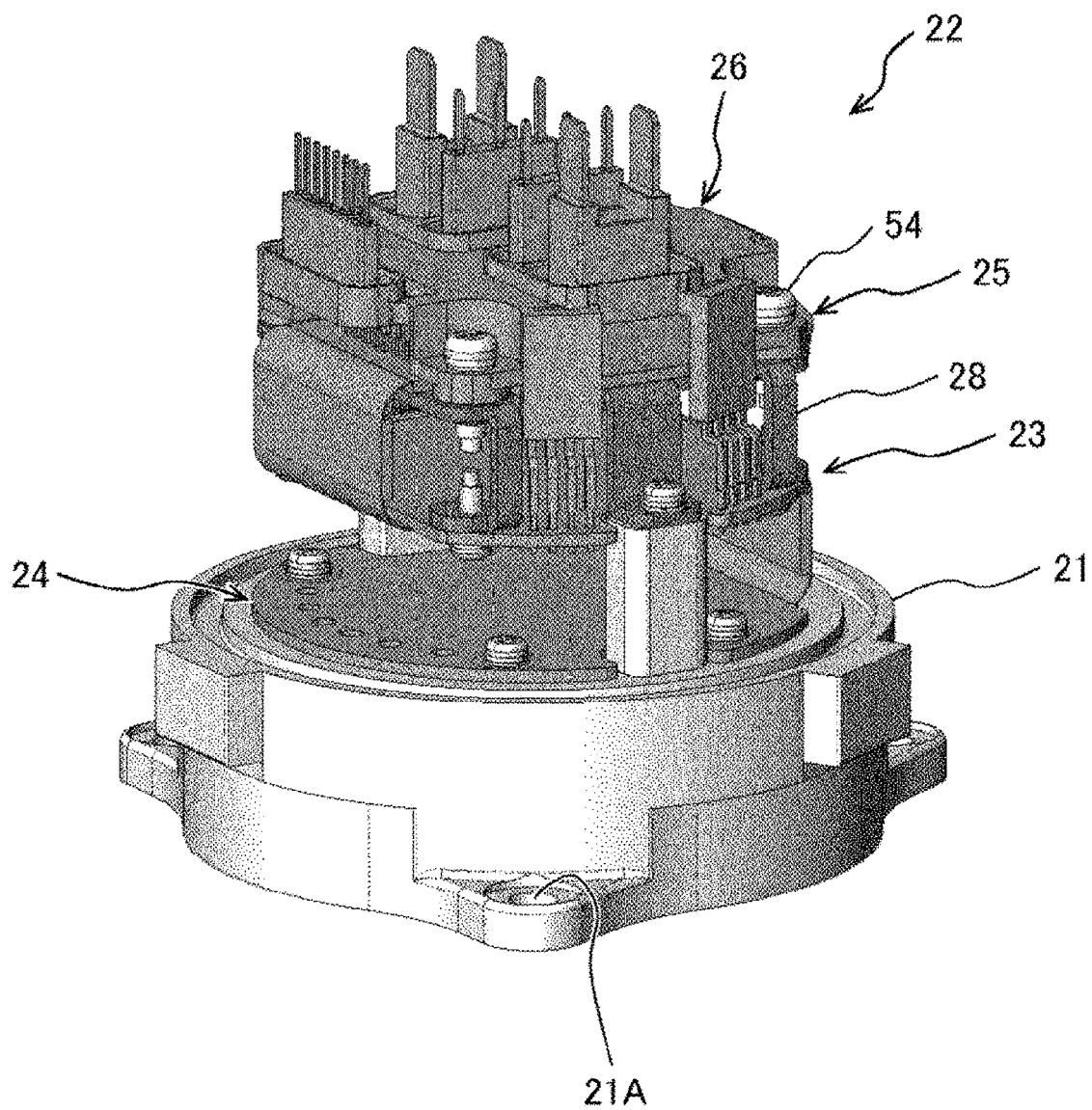
FIG. 5 is a perspective view illustrating a state in which the electronic control unit is assembled and illustrates a state in which the cover is removed.

FIG. 4 illustrates the power supply wires 42 and 45, the ground wires 43, 46, and 53 and the signal wires 48, 50, and 52 as seen through portions thereof molded in the connector terminal assembly basic substance 26A.

The connector terminal forming portions 41 and 44 for power supply are duplicated, and thus, the connector terminal forming portion 41 constitutes one system and the connector terminal forming portion 44 constitutes the other system. The power supply wire 42 and the ground wire 43 are embedded in the connector terminal forming portion 41. The power supply wire 45 and the ground wire 46 are embedded in the connector terminal forming portion 44.

One end portion 42A of the power supply wire 42 constitutes an external power supply connection terminal (+) connected to the external power supply, and the other end portion 42B of the power supply wire 42 constitutes a power supply circuit board connection terminal (+) connected to the power supply circuit board 23A of the power supply circuit unit 23. One end portion 43A of the ground wire 43 constitutes an external power supply connection terminal (−) connected to the external power supply (earth), and the other end portion 43B of the ground wire 43 constitutes a power supply circuit board connection terminal (−) connected to the power supply circuit board 23A of the power supply circuit unit 23.

One end portion 45A of the power supply wire 45 constitutes an external power supply connection terminal (+) connected to the external power supply, and the other end portion 45B of the power supply wire 45 constitutes a power supply circuit board connection terminal (+) connected to the power supply circuit board 23A of the power supply circuit unit 23. One end portion 46A of the ground wire 46 constitutes an external power supply connection terminal (−) connected to the external power supply (earth), and the other end portion 46B of the ground wire 46 constitutes a power supply circuit board connection terminal (−) connected to the power supply circuit board 23A of the power supply circuit unit 23.

Note that (+) means that it is connected to a high potential-side wire of a power supply wire, and (−) means that it is connected to a low potential-side wire (ground-side wire) of the power supply wire. In the following description, the notations (+) and (−) will be omitted unless particularly necessary.

The connector terminal forming portions 47 and 49 for transmitting the control state are duplicated, and thus, the connector terminal forming portion 47 constitutes one system and the connector terminal forming portion 49 constitutes the other system. A plurality of the signal wires 48 are embedded in the connector terminal forming portion 47, and a plurality of the signal wires 50 are embedded in the connector terminal forming portion 49.

One end portion 48A of the signal wire 48 constitutes an external device connection terminal connected to an external device such as an engine control unit (ECU), and the other end portion 48B of the signal wire 48 constitutes a control circuit board connection terminal connected to the control circuit board 25A of the control circuit unit One end portion 50A of the signal wire 50 constitutes an external device connection terminal connected to an external device such as the engine control unit (ECU), and the other end portion 50B of the signal wire 50 constitutes a control circuit board connection terminal connected to the control circuit board 25A of the control circuit unit 25.

The connector terminal forming portion 51 for the detection sensor is duplicated, and two systems are formed in the connector terminal forming portion 51. That is, a plurality of the signal wires 52 are embedded in the connector terminal forming portion 51, and the plurality of the signal wires 52 are divided into two systems.

One end portion 52A of the signal wire 52 constitutes an external device connection terminal connected to an external device such as the engine control unit (ECU), and the other end portion 52B of the signal wire 52 constitutes a control circuit board connection terminal connected to the control circuit board 25A of the control circuit unit 25.

As illustrated in FIG. 3, the power supply circuit board 23A includes a receiving terminal (through hole) 41C into which the power supply circuit board connection terminal 42B is inserted, and a receiving terminal (through hole) 43C into which the power supply circuit board connection terminal 43B is inserted.

Although hidden in FIG. 3, the power supply circuit board 23A includes a receiving terminal (through hole) into which the power supply circuit board connection terminal 45B is inserted, and a receiving terminal (through hole) into which the power supply circuit board connection terminal 46B is inserted.

The control circuit board 25A includes a receiving terminal (through hole) 48C into which the control circuit board connection terminal 48B of the signal wire 48 is inserted. Although hidden behind in FIG. 3, the control circuit board 25A also includes a receiving terminal (through hole) through which the control circuit board connection terminal 50B is inserted. Further, the control circuit board 25A includes a receiving terminal (through hole) 52C into which the control circuit board connection terminal 52B of the signal wire 52 is inserted.

The power supply circuit board connection terminal 42B and the receiving terminal (through hole) 41C constitute a press-fit type connector, the electrical connection is completed by inserting the power supply circuit board connection terminal 41B into the receiving terminal (through hole) 41C, and thus, soldering is not required.

The power supply circuit board connection terminals 43B, 45B, and 46B also constitute a press-fit type connector with the corresponding receiving terminals (through holes), similarly to the power supply circuit board connection terminal 42B. The control circuit board connection terminals 48B, 50B, and 52B also constitute a press-fit type connector with the corresponding receiving terminals (through holes) similarly to the power supply circuit board connection terminal 42B.

The power supply circuit board 23A is located away from the connector terminal assembly 26 so as to be closer to the basic substance 21 side (motor housing 11 side and electric motor side) than the control circuit board 25A, and thus, the control circuit board connection terminals 48B, 50B, and 52B extend further to the basic substance 21 side (motor housing 11 side and electric motor side) than the power supply circuit board connection terminals 43B, 45B, and 46B.

An assembly process of the electronic control unit 9 will be described with reference to FIG. 5 together with FIG. 3. FIG. 5 is a perspective view illustrating a state where the electronic control unit is assembled, and is a view illustrating a state where the cover is removed.

Assembly process 1: The spacer 30 is fixed to the power supply circuit board 23A and the control circuit board 25A by the fastening member 33 and the fastening member 31. In this state, the spacer 30 is not fixed to the column 21B.

Assembly process 2: The power conversion circuit board 24A is fixed to the basic substance 21 by the fastening member 28.

Assembly process 3: The spacer 30 is fixed to the column 21B by the fastening member 32.

In the assembly processes up to this point, the fixing of the spacer 30 and the power supply circuit board 23A by the fastening member 33 may be performed prior to the fixing of the spacer 30 to the column 21B, and thus, the order of the assembly process 1 and the assembly process 2 may be changed. Alternatively, after the spacer and the power supply circuit board 23A are fixed by the fastening member 33, the spacer 30 may be fixed to the column 21B by the fastening member 32 (assembly process 3), and then, the control circuit board 25A may be fixed to the spacer 30 by the fastening member 31.

In any case, before the connector terminal assembly 26 is assembled, the assembly of the power conversion circuit board 24A, the power supply circuit board 23A, and the control circuit board 25A with the basic substance 21 is completed.

Assembly process 4: The connector terminal assembly 26 is integrally assembled with the power conversion circuit board 24A, the power supply circuit board 23A, and the control circuit board 25A. In this process, the power supply circuit board connection terminals 42B, 43B, 45B, and 46B are inserted into the corresponding receiving terminals (through holes), and the control circuit board connection terminals 48B, 50B, and 52B are inserted into the corresponding receiving terminals (through holes). Further, in the connector terminal assembly 26, a fastening member (screw or bolt) 54 is inserted into a through hole 55, and the connector terminal assembly is fastened and fixed to the spacer 30.

In this case, the connector terminal assembly 26 may be straight pressed in insertion directions (rotation axis direction) of the power supply circuit board connection terminals 42B, 43B, 45B, and 46B and the control circuit board connection terminals 48B, 50B, and 52B into the receiving terminals (through holes). Since each connection terminal and each receiving terminal form a press-fit type connector, the electrical connection is completed simply by inserting each connection terminal into each receiving terminal.

In the present embodiment, in the assembly process 4, by assembling the connector terminal assembly 26 with the circuit component assembly 18, the power supply circuit board connection terminals 42B, 43B, 45B, and 46B and the control circuit board connection terminals 48B, 50B, and 52B configured in the connector terminal assembly 26 are electrically connected to the receiving terminals (through holes) of the two power supply circuit boards 23A and the control circuit board 25A disposed with a stage (height difference).

The power supply circuit board connection terminals 42B, 43B, 45B, and 46B and the control circuit board connection terminals 48B, 50B, and 52B are terminals to be inserted into the respective receiving terminals, and thus, may also be referred to as power supply circuit board insertion terminals 42B, 43B, 45B, and 46B and control circuit board insertion terminals 48B, 50B, and 52B.

Assembly process 5: The cover 13 is fixed to the basic substance 21.

In the electric drive device 6 of the power steering apparatus 1 of the present embodiment, in the assembly process 4 in which the connector terminal assembly 26 is integrally assembled with the power conversion circuit board 24A, the power supply circuit board 23A, and the control circuit board 25A, the electrical connection of the power supply circuit board connection terminals 42B, 43B, 45B, and 46B with respect to the power supply circuit board 23A and the electrical connection of the control circuit board connection terminals 48B, 50B, and 52B with respect to the control circuit board 25A are completed at the same time.

The power supply circuit board connection terminals 42B, 43B, 45B, 46B are wiring members for supplying power to the power supply circuit board 23A, and power is supplied from an external power supply to the power supply circuit unit 23A. Power required for the power conversion circuit unit 24 is supplied to the power conversion circuit board 24A through an electric wire provided in the first flexible portion 34 after removing noise with a filter in the power supply circuit unit 23A. Power required for the control circuit unit 25 is supplied to the control circuit board 25A through an electric wire provided in the second flexible portion 35 after removing noise with a filter in the power supply circuit unit 23A. Therefore, power with less noise can be supplied to the power conversion circuit unit 24 and the control circuit unit 25.

Various signals such as sensor signals and control signals are exchanged between the control circuit board 25A and the external device through the control circuit board connection terminals 48B, 50B, and 52B. Further, various signals are exchanged between the control circuit unit 25 and the power conversion circuit unit 24 by using the electric wire provided in the first flexible portion 34 and the electric wire provided in the second flexible portion 35. In this case, in the electric wires provided in the first flexible portion 34 and the second flexible portion 35, the signal wire and the power supply wire are mixed. However, since the current flows to the power supply wire after removing the noise, it is possible to suppress the mixing of noise into the signal (current) flowing through the signal wire.

In particular, there is a limit to increase width dimensions of the first flexible portion 34 and the second flexible portion 35, and thus, intervals of a plurality of electric wires provided in the first flexible portion 34 and the second flexible portion 35 decrease. Therefore, if the first flexible portion 34 and the second flexible portion 35 have electric wires through which a current including noise flows, the noises are easily mixed in the signal wires. However, in the present embodiment, it is possible to suppress the mixing of noise into the signal wires in the first flexible portion 34 and the second flexible portion 35, and thus, it is possible to realize the highly reliable electric drive device 6.

In the present embodiment, all signal exchanges between the control circuit unit 25 and the external device are performed through the control circuit board connection terminals 48B, 50B, and 52B, and the power required for the electric drive device 6 is supplied from the external power supply through the power supply circuit board connection terminals 42B, 43B, 45B, and 46B. Since the control circuit board connection terminals 48B, 50B, and 52B and the power supply circuit board connection terminals 41B, 43B, 45B, and 46B are disposed apart from each other, the signals of the control circuit board connection terminals 48B, 50B, and 52B are not easily affected by the noise contained in the current flowing through the power supply circuit board connection terminals 42B, 43B, 45B, and 46B, and it is possible to suppress the mixing of noise into the signals flowing through the control circuit board connection terminals 48B, 50B, and 52B.

In the present embodiment, as illustrated in FIG. 4, the control circuit board connection terminal 52B, the power supply circuit board connection terminal 43B, the power supply circuit board connection terminal 42B, the control circuit board connection terminal 48B, the control circuit board connection terminal 50B, the power supply circuit board connection terminal 46B, and the power supply circuit board connection terminal 45B are drawn out around the basic substance 26A of the connector terminal assembly 26 so as to be separated and dispersed in a circumferential direction about an axis O12 of the rotating shaft 12. As a result, when power is supplied from the external power supply to the power supply circuit unit 23 through the power supply circuit board connection terminals 42B, 43B, 45B, and 46B, it is possible to effectively suppress the mixing of the noise into the signals flowing through the control circuit board connection terminals 48B, 50B, and 52B.

Further, in the present embodiment, the control circuit board connection terminals 48B, 50B, and 52B and the power supply circuit board connection terminals 42B, 43B, 45B, and 46B constitute a press-fit type connector, and thus, at the time of press-fitting, a load is applied to the connector terminal assembly 26. In this case, the control circuit board connection terminals 48B, 50B, and 52B and the power supply circuit board connection terminals 42B, 43B, 45B, and 46B are disposed to be dispersed in the circumferential direction about the axis O12 of the rotating shaft 12, and thus, the applied load can be dispersed in the circumferential direction and can be made uniform. Therefore, a press fit work can be efficiently performed.

Further, in the present embodiment, the electrical connections between the boards 23A, 24A, and 25A disposed in multiple layers (3 stages), the control circuit board connection terminals 48B, 50B, and 52B, and the power supply circuit board connection terminals 42B, 43B, 45B, and 46B can be made collectively using the press-fit type connector. Further, the electric wire (electrical connection) between the respective boards 23A, 24A, and 25A is realized by the electric wire provided in the first flexible portion 34 and the second flexible portion 35 of the rigid flexible board integrally configured. Therefore, the wiring structure and the wiring work (wiring process) can be simplified, and the number of parts can be reduced. Moreover, since the number of connections of the electric wires is reduced, reliability of the electric drive device 6, and hence the power steering apparatus 1, is improved. Furthermore, an equipment for soldering and TIG welding is unnecessary. In addition, since a work of soldering and TIG welding is unnecessary, a work time for assembly can be shortened.

Further, in the present embodiment, the power supply circuit unit 23 is disposed in a middle of the three-stage board disposition. Accordingly, the electric wire from the power supply circuit unit 23 is shortened, and power can be supplied to the power conversion circuit unit 24 disposed in the lower stage (basic substance 21 side) and the control circuit unit 25 disposed in the upper stage (side opposite to the basic substance 21 side). Moreover, this is also the same when the power conversion circuit unit 24 is disposed in the upper stage and the control circuit unit is disposed in the lower stage. Therefore, the power conversion circuit unit 24 may be disposed in the upper stage and the control circuit unit 25 may be disposed in the lower stage.

However, by disposing the control circuit unit 25 in the upper stage, lengths of the control circuit board connection terminals 48B, 50B, and 52B can be shortened. Further, by disposing the power conversion circuit unit 24 in the lower stage, heat generated in the power conversion circuit unit 24 can be released to the basic substance 21, and the heat dissipation effect can be enhanced.

In addition, as illustrated in FIG. 4, in each of the power supply circuit board connection terminals (+) 42B and and the power supply circuit board connection terminals (−) 43B and 46B, an end portion of each of the power supply wires 42 and 45 and the ground wires (GND wires) 43 and 46 is branched into four. This is to ensure good press-fitting and to secure the current capacity necessary for each of the power supply wires 42 and 45 and the ground wires (GND wires) 43 and 46. It should be noted that the number of branches is not limited to four, and it may be branched into a plurality of necessary branches.

When the inverter-side connector terminal is TIG-welded to the inverter-side connector, and the control-side connector terminal is solder-joined to the connection hole of the control circuit unit as in the power steering apparatus of PTL 2, during the TIG welding and solder-joining, the TIG weld and the solder joint cannot be covered with other boards. For this reason, in a configuration which requires the TIG welding or the solder-joining, it is difficult to directly adopt a structure (for example, the structure as in PTL 1) in which rigid boards are stacked in multiple stages using rigid flexible boards.

Further, in the structure (for example, the structure as in PTL 1) in which the rigid boards are stacked in multiple stages using the rigid flexible boards, one rigid board is stacked so as to draw an arc with respect to the other rigid board. In this case, if a press-fit type connector is configured between two rigid boards, the connection terminal (insertion terminal) is inserted into the receiving terminal (through hole) while drawing an arc with respect to the receiving terminal (through hole), and thus, it is necessary to increase a hole diameter of the receiving terminal (through hole), and the press fit between the connection terminal and the receiving terminal cannot be established. Therefore, it is necessary to devise how to use the press-fit type connector.

According to the present embodiment, it is possible to solve the above-mentioned problems of TIG welding and solder joining in the rigid flexible board and the problems of the press-fit type connector in the rigid flexible board.

It should be noted that the present invention is not limited to the above-described embodiment and includes various modification examples. For example, the above-described embodiment is described in detail in order to explain the present invention in an easy-to-understand manner, and is not necessarily limited to that having all the configurations. Further, it is possible to perform addition/deletion/replacement on other configurations with respect to a portion of the configurations of the embodiment.

REFERENCE SIGNS LIST 1 power steering apparatus
12 output shaft of electric motor
9 electronic control unit
23A power supply circuit board
24A power conversion circuit board
25A control circuit board
42, 45 power supply wiring member
48, 50, 52 signal wiring member
26 connector terminal assembly
6 electric drive device
34 first flexible portion
35 second flexible portion
42B, 43B, 45B, 46B power supply circuit board connection insertion terminal
48B, 50B, 52B control circuit board connection terminal
42C, 43C receiving terminal of power supply circuit board
23A
48C, 52C receiving terminal of control circuit board 25

The invention claimed is:

1. An electric drive device of an electric power steering apparatus comprising:
an electric motor; and
an electronic control unit which is disposed on a side opposite to an output shaft of the electric motor with respect to the electric motor in an axial direction of the output shaft and controls the electric motor,
wherein
the electronic control unit includes a power supply circuit board which generates a power supply, a power conversion circuit board which has a power switching element which drives and controls the electric motor, a control circuit board which controls the power switching element, and a connector terminal assembly which constitutes a connector terminal with a power supply wiring member and a signal wiring member,
the power supply circuit board, the power conversion circuit board, and the control circuit board have a first flexible portion and a second flexible portion between two adjacent boards, and are stacked and disposed in three stages in which the power supply circuit board is disposed between the power conversion circuit board and the control circuit board with the first flexible portion and the second flexible portion as a bend portion,
the connector terminal assembly has a power supply circuit board connection terminal which is provided at an end portion of the power supply wiring member and a control circuit board connection terminal which is provided at an end portion of the signal wiring member, and is disposed on a side away from the electric motor with respect to the power supply circuit board, the power conversion circuit board, and the control circuit board, and
the power supply circuit board connection terminal and the control circuit board connection terminal are electrically connected to a receiving terminal of the power supply circuit board and a receiving terminal of the control circuit board, respectively, by being inserted and press-fitted thereinto.

2. The electric drive device of an electric power steering apparatus according to claim 1, wherein the control circuit board is disposed on the side away from the electric motor with respect to the power supply circuit board and is disposed closer to the connector terminal assembly than the power supply circuit board and the power conversion circuit board.

3. The electric drive device of an electric power steering apparatus according to claim 2, wherein
power supplied from an external power supply is supplied to the power supply circuit board via the power supply circuit board connection terminal,
power filtered by the power supply circuit board is supplied to the power conversion circuit board via an electric wire provided in the first flexible portion, and
the power filtered by the power supply circuit board is supplied to the control circuit board via an electric wire provided in the second flexible portion.

4. The electric drive device of an electric power steering apparatus according to claim 3, wherein a sensor signal or a signal of a control signal flows to the control circuit board via the control circuit board connection terminal, and flows from the control circuit board to the power supply circuit board via the second flexible portion.

5. The electric drive device of an electric power steering apparatus according to claim 4, wherein the power supply circuit board connection terminal provided at the end portion of the power supply wiring member is branched into a plurality of terminals.

* * * * *